US008554622B2

(12) United States Patent
Chow et al.

(10) Patent No.: US 8,554,622 B2
(45) Date of Patent: Oct. 8, 2013

(54) EVALUATING PERFORMANCE OF BINARY CLASSIFICATION SYSTEMS

(75) Inventors: Richard Tao-Hwa Chow, Sunnyvale, CA (US); Pavel Berkhin, Sunnyvale, CA (US); Elena Eneva, Mountain View, CA (US); Boris Klots, Belmont, CA (US); Nicolas Eddy Mayoraz, Cupertino, CA (US); Rajesh Girish Parekh, Mountain View, CA (US)

(73) Assignee: Yahoo! Inc., Sunnyvale, CA (US)

(*) Notice: Subject to any disclaimer, the term of this patent is extended or adjusted under 35 U.S.C. 154(b) by 1788 days.

(21) Appl. No.: 11/612,004

(22) Filed: Dec. 18, 2006

(65) Prior Publication Data

US 2008/0148106 A1    Jun. 19, 2008

(51) Int. Cl.
*G06Q 30/00*    (2012.01)
(52) U.S. Cl.
USPC .......................................... 705/14.47; 706/20
(58) Field of Classification Search
USPC ............. 705/14.47, 14.49, 14.48; 706/20, 12; 714/49
See application file for complete search history.

(56) References Cited

U.S. PATENT DOCUMENTS

| | | | | |
|---|---|---|---|---|
| 6,418,409 B1* | 7/2002 | Metzger | ......................... | 704/240 |
| 7,519,828 B2* | 4/2009 | Kittler et al. | ................... | 713/186 |
| 7,561,972 B1* | 7/2009 | Welch et al. | ..................... | 702/19 |
| 8,260,730 B2* | 9/2012 | Forman et al. | ................... | 706/20 |
| 2003/0078783 A1* | 4/2003 | Yamamoto et al. | ........... | 704/273 |
| 2004/0039543 A1* | 2/2004 | Keck | ............................ | 702/145 |
| 2006/0173559 A1* | 8/2006 | Kirshenbaum et al. | ......... | 700/31 |
| 2006/0206443 A1* | 9/2006 | Forman et al. | ................... | 706/20 |
| 2007/0127787 A1* | 6/2007 | Castleman et al. | ........... | 382/118 |
| 2007/0162406 A1* | 7/2007 | Lanckriet | ........................ | 706/20 |
| 2007/0192190 A1* | 8/2007 | Granville | ........................ | 705/14 |

FOREIGN PATENT DOCUMENTS

WO    WO 02/065455 A1 *    8/2002

OTHER PUBLICATIONS

IBM, Optimal Tri-State Classifier Using Roc Analysis, Published Oct. 4, 2004 at IP.com.*
Juang, Minimum Classification Error Rate Methods for Speech Recognition, IEEE Transactions on Speech and Audio Processing, vol. 5, No. 3, May 1997.*
Dr. Alexander Tuzhilin, "The Lane's Gifts v. Google Report," Official Google Blog: Findings on invalid clicks, posted Jul. 21, 2006, pp. 1-47. http://googleblog.blogspot.com/2006/07/findings-on-invalid-clicks.html.

* cited by examiner

*Primary Examiner* — John G Weiss
*Assistant Examiner* — Bennett Sigmond
(74) *Attorney, Agent, or Firm* — Weaver Austin Villeneuve & Sampson LLP

(57) ABSTRACT

Methods and apparatus are described for evaluating a binary classification system operable to classify each of a plurality of events as a first event type or a second event type. At least some of the events of the first event type are independently verifiable with reference to verification data. The binary classification system is susceptible to a first error type in which events of the first event type are classified as the second event type, and a second error type in which events of the second event type are classified as the first event type. Operation of a first configuration of the binary classification system is evaluated with reference to an objective function. The objective function is derived by expressing a number of errors of the second error type in terms of a number of errors of the first error type with reference to the verification data, and by assuming relative proportions of the first and second event types within the plurality of events.

19 Claims, 3 Drawing Sheets

EVALUATING PERFORMANCE OF BINARY CLASSIFICATION SYSTEMS

BACKGROUND OF THE INVENTION

The present invention relates to techniques for evaluating the performance of binary classification systems. More particularly, specific embodiments of the invention relate to fraud detection systems.

"Click-based" online advertising systems require an advertiser to pay the system operator or its partners each time a user selects or "clicks" on the advertiser's online advertisement or sponsored search link. Unfortunately, the nature of such a system provides opportunities for some to click on ads for improper or fraudulent reasons. This is referred to generally as "click fraud." For example, a provider of online advertising services may partner with a third party to place ads for an advertiser on the third party's web site with a portion of the revenue for each click going to the third party. This provides a financial incentive for the third party to click the links on its own site. In another example, one company might be motivated to click on the ads of a competitor to drive up advertising costs for the competitor. Some click fraud efforts are fairly large in scale with groups of people being paid to engage in such activity, i.e., "click farms." There are even automated process for engaging in click fraud, e.g., web crawling bots, ad-ware, and various kinds of mal-ware.

The rapid rise in click-based online advertising, and the ease with which click fraud may be perpetrated has spurred the development of systems designed to detect click fraud. Such systems evaluate click events with reference to one or more of a wide range of criteria to determine whether a click is "good," e.g., a valid click by an interested consumer, or "bad," i.e., a fraudulent click. For example, clicks by self-declared bots may be automatically identified as fraudulent. In addition, a large number of clicks from the same user within a specified period of time may be identified as fraudulent. The clicks are then filtered on this basis and the advertisers billed accordingly.

Unfortunately, given the difficulty in determining whether a click event amounts to click fraud, click fraud detection systems typically generate some number of false positives, i.e., valid events which are incorrectly identified as invalid or fraudulent, and false negatives, i.e., invalid or fraudulent events which are incorrectly identified as valid. In addition, it is extremely difficult to evaluate the performance of a click fraud detection system in that it is difficult, if not impossible, to determine the number of false negatives. That is, a false negative is difficult to identify because there is no evidence that the click event identified as valid is fraudulent, i.e., it is indistinguishable from many other valid click events.

Thus, because it is nearly impossible to distinguish false negatives from valid events, it is extremely difficult to evaluate the performance of click fraud detection systems. This is problematic in that it undermines advertisers' confidence that they are paying for valid events.

SUMMARY OF THE INVENTION

According to various specific embodiments of the invention, methods and apparatus are provided for evaluating a binary classification system operable to classify each of a plurality of events as a first event type or a second event type. At least some of the events of the first event type are independently verifiable with reference to verification data. The binary classification system is susceptible to a first error type in which events of the first event type are classified as the second event type, and a second error type in which events of the second event type are classified as the first event type. Operation of a first configuration of the binary classification system is evaluated with reference to an objective function. The objective function is derived by expressing a number of errors of the second error type in terms of a number of errors of the first error type with reference to the verification data, and by assuming relative proportions of the first and second event types within the plurality of events.

According to a subset of embodiments, the binary classification system comprises a click fraud detection system, the events comprise click events each corresponding to selection of a sponsored search link, the first event type comprises valid click events, the second event type comprises fraudulent click events, the first error type comprises false positives, and the second error type comprises false negatives.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, an objective function is proposed which may be employed to evaluate the effectiveness of a binary classification system, e.g., a fraud detection system, and, in particular, whether a change to a binary classification system represents an improvement. A generalized formulation for such an objective function in the fraud detection context is given by:

$$ObjFunc = (\#events\ that\ are\ good\ but\ deemed\ fraud) \cdot C + (\#events\ deemed\ valid) \quad (1)$$

The following discussion focuses on an example of a fraud detection system which is intended to detect click fraud. It should be noted, however, that this is merely one example of a binary classification system which may be evaluated using the techniques described herein, and that embodiments of the invention are much more broadly applicable. More generally, embodiments of the present invention may be applied to evaluate the effectiveness of a wide variety of binary classification systems. The scope of the invention should therefore not be limited to fraud detection.

Figure 1:
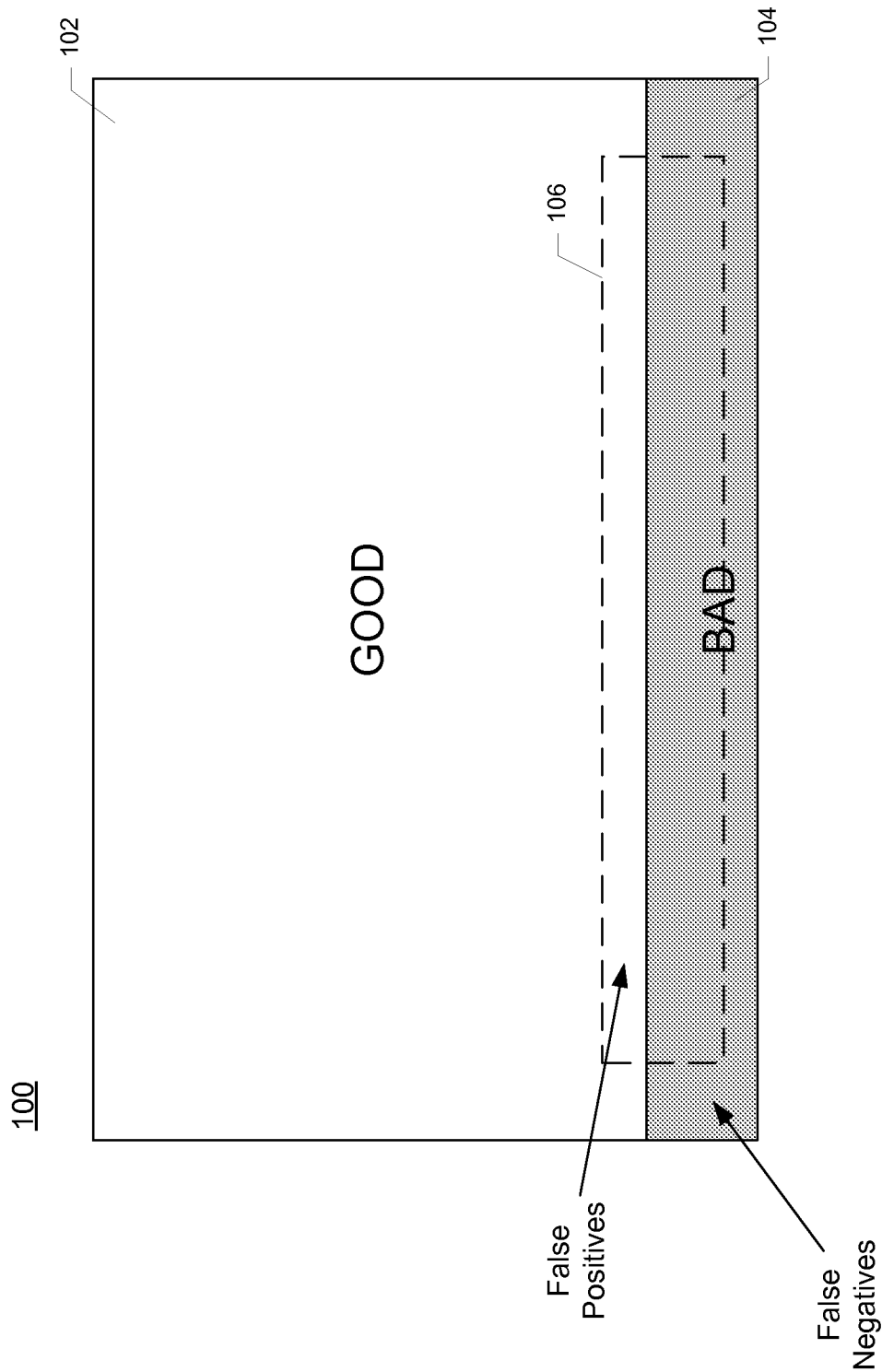
FIG. 1 is a diagram illustrating an event set for evaluation by a fraud detection system.

FIG. 1 shows the relationships for a population of events (of which click events are a specific example) for which embodiments of the present invention may be useful. The population of events 100 may be divided between "good" or valid events 102, and "bad" or invalid/fraudulent events 104. A subset of events defined by box 106 represents events which are filtered by a fraud detection system, i.e., identified as fraudulent. As shown, some of the filtered events are actually good events, i.e., false positives, while some of the bad events are not filtered, i.e., false negatives. The goal of any fraud detection system is to minimize one or both of these event subsets, i.e., to have the filtered events 106 correspond as closely as possible to the bad events 104.

As discussed above, in the context of click fraud, it can be very difficult to distinguish between some fraudulent click events and valid click events. However, while it may be difficult to determine whether a click event was actually fraudulent, there are circumstances in which it is possible to determine with a relatively high degree of confidence that a click event was valid. For example, many advertisers instrument their web sites so that they can track so-called "conversions" relating to click events.

In general, the term conversion may refer to any outcome deemed desirable from the advertiser's point of view. The actual sale of goods or services related to the ad corresponding to the click event is a good example of one type of conversion. The user registering or signing up for something is another good example. It should be noted, however, that the term conversion is much more widely applicable.

According to specific embodiments of the invention, data relating to filtered click events later identified as valid, i.e., false positives, may be used to estimate the effectiveness of a click fraud detection system while getting around the difficult of identifying fraudulent click events which are not filtered by the system, i.e., false negatives. This is enabled by an assumption based on an estimate of the proportion of "good" clicks or "bad" clicks in the overall set of click events.

In the context of click fraud, the generalized objective function of equation (1) is given by:

$$ObjFunc = (\#\text{clicks that are converting but deemed invalid}) \cdot C + (\#\text{clicks deemed valid}) \quad (2)$$

which represents that the objective function is the number of clicks that convert and yet are filtered times a constant C, plus the total number of clicks that are not filtered. Lower values of the objective function imply a better filtering system. According to some embodiments, the constant C depends on the percentage of traffic monitored for conversion, and the conversion rate for valid traffic. As will be discussed, to evaluate a change in a click fraud detection system (e.g., a new filter request), it should be verified that the value of the objective function is lower after the change.

The motivation for the objective functions of (1) and (2) is an ideal objective function derived with reference to the conceptual framework represented in FIG. 1, and given by:

$$\text{Ideal } ObjFunc = (\#\text{False Positives}) \cdot w_{FP} + (\#\text{False Negatives}) \cdot w_{FN} \quad (3)$$

where $w_{FP}$ and $w_{FN}$ are weights which reflect, for example, the costs associated with the respective events. For example, in the context of click fraud, $w_{FP}$ might represent the cost to the provider of advertising services for not charging an advertiser for a valid click event which was incorrectly identified as fraudulent. In the same context, $w_{FN}$ might represent the cost to the service provider of charging an advertiser for a fraudulent click. In the context of click fraud, equation (3) is then transformed by expressing false negatives in terms of false positives. Also, according to a specific embodiment, the number of false positives can be estimated by using conversion data.

Generally speaking, objective functions employed to evaluate binary classification systems according to various embodiments of the invention take advantage of knowledge of one class of events, e.g., valid events, to express one kind of mistake, e.g., false negatives, in terms of the other kind of mistake, e.g., false positives. According to a specific embodiment of the invention relating to click fraud detection, false negatives are expressed in terms of false positives according to the following derivation. Referring to the illustrative diagram of FIG. 1, the number of false negatives may be expressed as follows:

$$(\#\text{False Negatives}) = (\#\text{clicks}) \cdot Prob(\text{not good, not filtered}) \quad (4)$$

That is, as can be seen from FIG. 1, the number of false negatives is defined to be the total number of clicks (i.e., the entire population of events 100) times the probability of an event being "bad" or "fraudulent" and not filtered. As expected, this corresponds to the portion of bad events 104 outside of the filtered events 106, i.e., false negatives. False negatives may also be defined in terms of the number of unfiltered events minus the number of unfiltered, good events, or:

$$(\#\text{False Negatives}) = (\#\text{clicks}) \cdot (Prob(\text{not filtered}) - Prob(\text{not filtered, good})) \quad (5)$$

The number of unfiltered good events may then be expressed as the number of good events minus the number of filtered, good events, resulting in:

$$(\#\text{ False Negatives}) = (\#\text{ clicks}) * (Prob(\text{not filtered}) - \quad (6)$$
$$Prob(\text{good}) + Prob(\text{good, filtered}))$$
$$= (\#\text{ not filtered}) - (\#\text{ good}) +$$
$$(\#\text{ False Positives})$$

Thus, false negatives are now expressed in terms of false positives.

Substituting for (#False Negatives) in the ideal objective function of equation (3), we obtain:

$$\text{Ideal } ObjFunc = (\#\text{False Positives}) \cdot (w_{FP} + w_{FN}) + (\#\text{not filtered}) \cdot w_{FN} - \text{Constant} \quad (7)$$

Next we derive an alternate expression for #False Positives in terms of conversion data. First, we assume that, for good clicks, conversion and being filtered are independent. That is, conversion events are relatively uniform within both filtered and unfiltered good events, or:

$$Prob(\text{Converting, filtered}|\text{good}) = Prob(\text{Converting}|\text{good}) * Prob(\text{filtered}|\text{good}) \quad (8)$$

It should be noted that in cases where this assumption is not correct, care must be taken to avoid building the assumption into any algorithm which designs the detection filter.

Let K be the conversion rate for valid clicks and M be the percentage of traffic that is monitored for conversion. Then each conversion represents 1/KM valid clicks. Alternatively, Prob(Converting|good)=KM. Now note:

$$(\text{\# Converting but filtered}) = Prob(\text{Converting filtered} \mid \text{good}) \cdot (\text{\# good}) \quad (9)$$
$$= Prob(\text{Converting} \mid \text{good}) \cdot Prob(\text{filtered} \mid \text{good}) \cdot (\text{\# good})$$

Therefore, $$(\text{\# False Positives}) = Prob(\text{filtered} \mid \text{good}) \cdot (\text{\# good}) \quad (10)$$
$$= (\text{\# Converting but filtered})/KM$$

Substituting into equation (7), we obtain the objective function below:

$$ObjFunc = (\text{\# Converting but filtered}) \cdot \frac{1}{KM} \cdot (w_{FP} + w_{FN}) + \quad (11)$$
$$(\text{\# not filtered}) \cdot w_{FN} - \text{Constant}$$

According to a specific embodiment, the constant C in the objective function of equation (3) has the following form:

$$C = \frac{1}{KM} \cdot \frac{(w_{FP} + w_{FN})}{w_{FN}} \quad (12)$$

As will be understood, the values with which constant C is comprised may vary depending on the particular circumstances. For exemplary purposes, these values may be estimated as follows:

For this example, we will assume that $w_{FN}$ and $w_{FP}$ are roughly equal, or $w_{FN} = w_{FP}$. This assumption is based on the assumption of an underlying shared cost model between the provider of online advertising services and the advertiser. The first term, $w_{FN}$, represents the cost to the advertiser, and $w_{FP}$ the cost to the advertising services provider. Essentially, these values reflect the relative costs of false negatives and false positives. And even though these may vary considerably depending on the specific circumstances, the technique is generalizable to reflect such circumstances.

To estimate K for this example, we assume 85% of clicks are valid as discussed below. This implies:

$$\frac{(0.85)}{ConversionRateAllTraffic} \le \frac{1}{K} =$$
$$\frac{1}{ConversionRateValidTraffic} \le \frac{1}{ConversionRateAllTraffic}$$

Finally, M is the percentage of clicks coming from advertisers that supply conversion information. Based on these assumptions, we can give a rough estimate for C as follows.

The data determine the conversion rate over all traffic. M is also known. Then constant C can be bounded as follows:

$$\frac{(0.85)}{ConversionRateAllTraffic} \cdot \frac{1}{M}(2) \le C =$$

$$\frac{1}{KM} \cdot \frac{(w_{FP} + w_{FN})}{w_{FN}} \le \frac{1}{ConversionRateAllTraffic} \cdot \frac{1}{M}(2) \quad (2)$$

For evaluation of the objective function of equation (3), it is simplest to take a C value in the middle of this range, or:

$$C = \frac{0.92}{ConversionRateAllTraffic} \cdot \frac{2}{M} \quad (13)$$

As described above in the example above, the proportion of good clicks in the overall set of click events was set at 85%. This is based on the general assumption in the industry that this proportion is in the range of 80-90%. Such an estimate may be derived from data provided by companies such as, for example, Click Forensics, Inc., of San Antonio, Tex.

Figure 2:
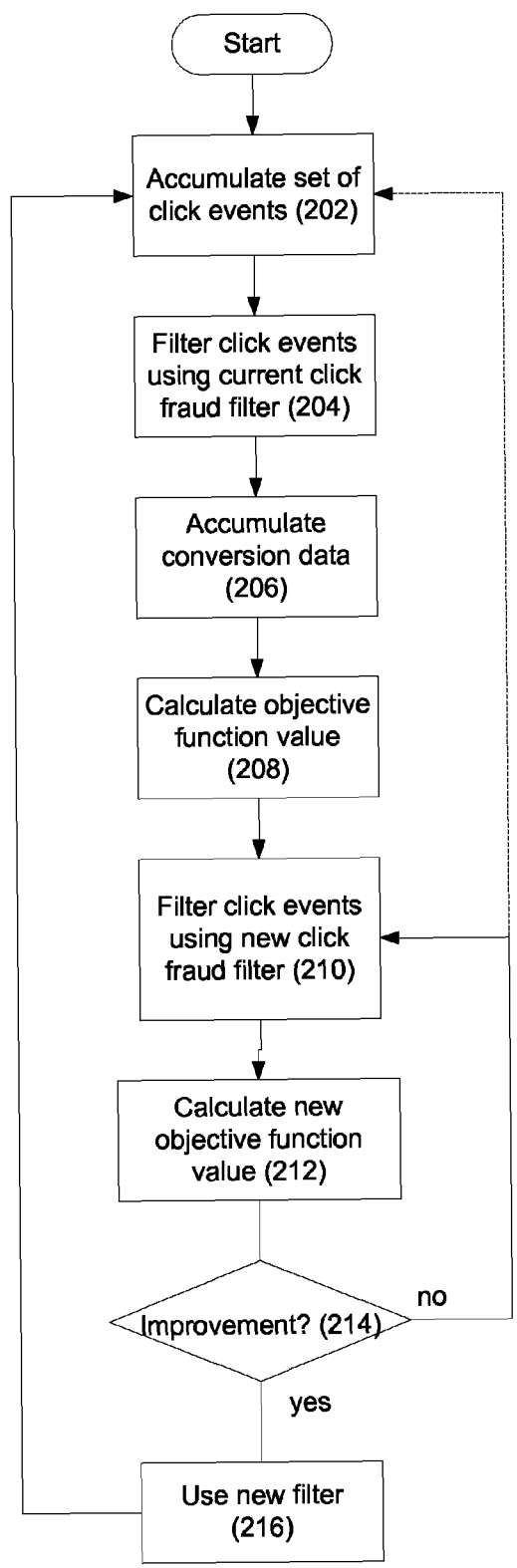
FIG. 2 is a flowchart illustrating operation of a specific embodiment of the invention.

The evaluation of a particular type of binary classification system, i.e., a click fraud detection system, according to a specific embodiment of the invention will now be described with reference to FIG. 2. In particular, the objective function derived above will be employed to determine whether a proposed change to a click fraud detection filter results in improved performance, i.e., whether filter A is better than filter B. Initially, a set of click events is accumulated over a period of time (202). The click events are filtered using a first configuration of a click fraud detection filter (204). Conversion data are then accumulated for a portion of the click events, including for at least some of the click events identified as fraudulent (206). These conversion data may be provided by only a subset of advertisers. The data relating to click events identified as false positives are then employed to calculate a value of an objective function derived according to a specific embodiment of the present invention (208).

The same set of click events are filtered using a second configuration of the click fraud detection filter (210). As will be understood, one or more different filters may be applied to the click event data set sequentially in any order, or substantially simultaneously. The conversion data are again employed to calculate another value of the objective function to determine whether the second filter represents an improvement (212). As discussed above, for specific embodiments, an improvement is represented by a lower value of the objective function. If an improvement is seen (214), the fraud detection system may be configured to proceed with the second filter configuration (216). As will be understood and as shown in FIG. 2, this process may be repeated iteratively with a variety of filter configurations to achieve increasing improvements in fraud detection.

Figure 3:
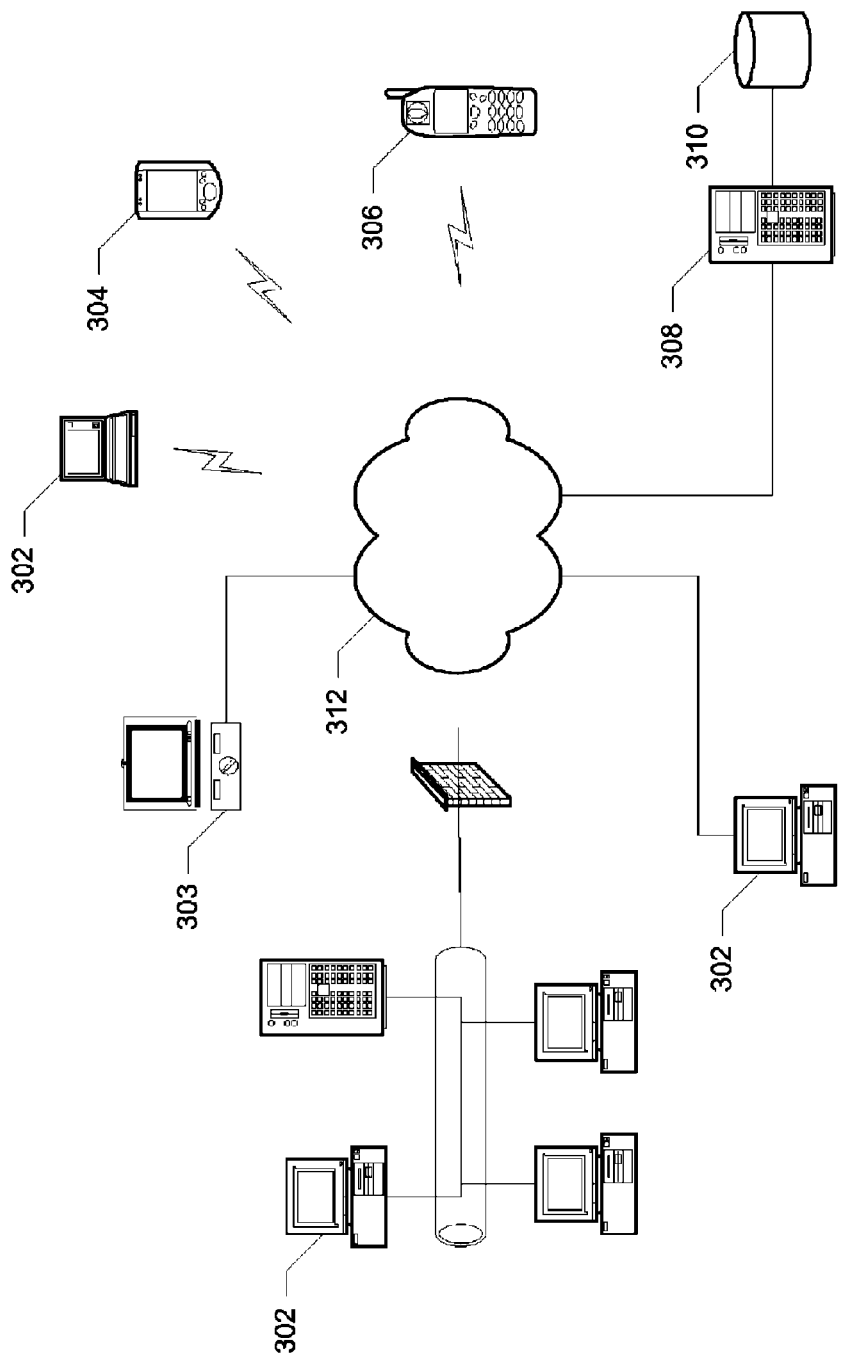
FIG. 3 is a simplified diagram of a network environment in which specific embodiments of the present invention may be implemented.

Embodiments of the present invention may be employed to facilitate evaluation of binary classification systems in any of a wide variety of computing contexts. For example, as illustrated in FIG. 3, implementations are contemplated in which the relevant set of events being classified are generated by a population of users interact with a diverse network environment via any type of computer (e.g., desktop, laptop, tablet, etc.) 302, media computing platforms 303 (e.g., cable and satellite set top boxes and digital video recorders), handheld computing devices (e.g., PDAs) 304, cell phones 306, or any other type of computing or communication platform.

And according to various embodiments, click event and conversion data processed in accordance with the invention may be collected using a wide variety of techniques. For example, collection of data representing a click event and any associated activities may be accomplished using any of a variety of well known mechanisms for recording online events. Once collected, these data may be processed in order to facilitate event classification according to the invention in a centralized manner. This is represented in FIG. 3 by server 308 and data store 310 which, as will be understood, may correspond to multiple distributed devices and data stores.

The various aspects of the invention may also be practiced in a wide variety of network environments (represented by network 312) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, as described herein, the present invention is not limited to evaluating the performance of fraud detection systems in the click fraud context. For example, embodiments of the present invention could be used to evaluate fraud detection effectiveness in situations in which an entity attempts to affect page rank in search results by repeatedly effecting fraudulent searches, i.e., "impression spam."

More generally, any binary classification problem in which (1) training data of only one type is available, e.g., either only good events or only bad events may be readily identified, and (2) a reasonable a priori estimate of the true proportions of the different classes in the population is known, may construct and employ an objective function in accordance with the present invention. In the example described above relating to click fraud, the available training data were data relating to good events. However, other implementations are contemplated in which the available data correspond to bad or fraudulent events, in which case, the false positives would be expressed in terms of the false negatives.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for evaluating a binary classification system operable to classify each of a plurality of events as a first event type or a second event type, at least some of the events of the first event type, but none of the second type, being independently verifiable with reference to verification data, the binary classification system being susceptible to a first error type in which events of the first event type are classified as the second event type, and a second error type in which events of the second event type are classified as the first event type, the method comprising evaluating with a computing device operation of a first configuration of the binary classification system with reference to an objective function, the objective function having been derived by expressing a number of errors of the second error type exclusively in terms of a number of errors of the first error type with reference to the verification data, and by assuming relative proportions of the first and second event types within the plurality of events, the objective function having been further derived with reference to a first cost associated with making errors of the first error type and a second cost associated with making errors of the second error type, and wherein the first and second costs are assumed to be substantially the same.

2. The method of claim 1 further comprising evaluating operation of a second configuration of the binary classification system with reference to the objective function, and comparing values of the objective function for the first and second configurations.

3. The method of claim 1 wherein evaluating operation of the binary classification system with reference to the objective function comprises attempting to minimize a value of the objective function.

4. The method of claim 1 wherein the first event type comprises valid events, the second event type comprises invalid events, the first error type comprises false positives, and the second error type comprises false negatives.

5. The method of claim 1 wherein the first event type comprises invalid events, the second event type comprises valid events, the first error type comprises false negatives, and the second error type comprises false positives.

6. The method of claim 1 wherein the binary classification system comprises a click fraud detection system, the events comprise click events each corresponding to selection of a sponsored search link, the first event type comprises valid click events, the second event type comprises fraudulent click events, the first error type comprises false positives, and the second error type comprises false negatives.

7. The method of claim 6 wherein the verification data comprises conversion data for selected ones of the valid click events identified as fraudulent click events.

8. The method of claim 7 wherein the objective function is further derived with reference to a proportion of the click events represented by the conversion data.

9. The method of claim 6 wherein the first configuration of the binary classification system corresponds to a first filter for filtering the click events, the method further comprising evaluating operation of a second configuration of the binary classification system with reference to the objective function, the second configuration corresponding to a second filter for filtering the click events, the method further comprising comparing values of the objective function for the first and second filters.

10. A computer program product for evaluating a binary classification system, the binary classification system being operable to classify each of a plurality of events as a first event type or a second event type, at least some of the events of the first event type, but none of the second type, being independently verifiable with reference to verification data, the binary classification system being susceptible to a first error type in which events of the first event type are classified as the second event type, and a second error type in which events of the second event type are classified as the first event type, the computer program product comprising at least one non-transient computer-readable medium having computer program instructions stored therein operable when executed by at least one computer to evaluate operation of a first configuration of the binary classification system with reference to an objective function, the objective function having been derived by expressing a number of errors of the second error type exclusively in terms of a number of errors of the first error type with reference to the verification data, and by assuming relative proportions of the first and second event types within the plurality of events, the objective function having been further derived with reference to a first cost associated with making errors of the first error type and a second cost associated with making errors of the second error type, and wherein the first and second costs are assumed to be substantially the same.

11. The computer program product of claim 10 wherein the computer program instructions are further operable when executed by at least one computer to evaluate operation of a second configuration of the binary classification system with reference to the objective function, and comparing values of the objective function for the first and second configurations.

12. The computer program product of claim 10 wherein the computer program instructions are further operable when executed by at least one computer to evaluate operation of the binary classification system with reference to the objective function by attempting to minimize a value of the objective function.

13. The computer program product of claim 10 wherein the first event type comprises valid events, the second event type comprises invalid events, the first error type comprises false positives, and the second error type comprises false negatives.

14. The computer program product of claim 10 wherein the first event type comprises invalid events, the second event type comprises valid events, the first error type comprises false negatives, and the second error type comprises false positives.

15. The computer program product of claim 10 wherein the binary classification system comprises a click fraud detection system, the events comprise click events each corresponding to selection of a sponsored search link, the first event type comprises valid click events, the second event type comprises fraudulent click events, the first error type comprises false positives, and the second error type comprises false negatives.

16. The computer program product of claim 15 wherein the verification data comprises conversion data for selected ones of the valid click events identified as fraudulent click events.

17. The computer program product of claim 16 wherein the objective function is further derived with reference to a proportion of the click events represented by the conversion data.

18. The computer program product of claim 15 wherein the first configuration of the binary classification system corresponds to a first filter for filtering the click events, and wherein the computer program instructions are further operable when executed by at least one computer to evaluate operation of a second configuration of the binary classification system with reference to the objective function, the second configuration corresponding to a second filter for filtering the click events, and wherein the computer program instructions are further operable when executed by at least one computer to compare values of the objective function for the first and second filters.

19. A binary classification system comprising at least one computing device configured to:
classify each of a plurality of events as a first event type or a second event type, at least some of the events of the first event type, but none of the second type, being independently verifiable with reference to verification data, the binary classification system being susceptible to a first error type in which events of the first event type are classified as the second event type, and a second error type in which events of the second event type are classified as the first event type; and
evaluate operation of a first configuration of the binary classification system with reference to an objective function, the objective function having been derived by expressing a number of errors of the second error type exclusively in terms of a number of errors of the first error type with reference to the verification data, and by assuming relative proportions of the first and second event types within the plurality of events, the objective function having been further derived with reference to a first cost associated with making errors of the first error type and a second cost associated with making errors of the second error type, and wherein the first and second costs are assumed to be substantially the same.

* * * * *